(12) United States Patent
Cadotte et al.

(10) Patent No.: US 11,858,059 B2
(45) Date of Patent: Jan. 2, 2024

(54) WELD WHEEL CLEANING SYSTEM

(71) Applicant: Cleveland-Cliffs Steel Properties Inc., West Chester, OH (US)

(72) Inventors: Daniel J. Cadotte, Middletown, OH (US); David E. Brandau, Monroe, MI (US)

(73) Assignee: Cleveland-Cliffs Steel Properties, West Chester, OH (US)

( * ) Notice: Subject to any disclaimer, the term of this patent is extended or adjusted under 35 U.S.C. 154(b) by 0 days.

(21) Appl. No.: 17/523,351

(22) Filed: Nov. 10, 2021

(65) Prior Publication Data

US 2022/0063013 A1    Mar. 3, 2022

Related U.S. Application Data

(62) Division of application No. 15/801,415, filed on Nov. 2, 2017, now Pat. No. 11,207,745.

(60) Provisional application No. 62/417,812, filed on Nov. 4, 2016.

(51) Int. Cl.
*B23K 11/30* (2006.01)
*B23K 26/244* (2014.01)
*A47L 5/12* (2006.01)
*B29C 65/00* (2006.01)

(52) U.S. Cl.
CPC ...... *B23K 11/3063* (2013.01); *B23K 11/3036* (2013.01); *A47L 5/12* (2013.01); *B23K 26/244* (2015.10); *B29C 66/876* (2013.01)

(58) Field of Classification Search
CPC ............ B23K 11/3036; B23K 11/3063; B23K 26/244; B29C 66/876; A47L 5/12
See application file for complete search history.

(56) References Cited

U.S. PATENT DOCUMENTS

| | | | | |
|---|---|---|---|---|
| 5,062,189 A | * | 11/1991 | Aebersold | B23K 11/3063 82/131 |
| 5,306,319 A | * | 4/1994 | Krishnan | C08G 59/5026 51/293 |
| 10,850,345 B2 | * | 12/2020 | Yamaashi | B23K 11/3036 |

FOREIGN PATENT DOCUMENTS

KR      20160100019      *  8/2016  ............. B23K 11/11

* cited by examiner

*Primary Examiner* — Dana Ross
*Assistant Examiner* — Joe E Mills, Jr.
(74) *Attorney, Agent, or Firm* — Frost Brown Todd LLP

(57) ABSTRACT

A weld wheel cleaning system is provided to clean or remove a layer of embedded material and other debris produced from welding from the working surface of a weld wheel. Such a weld wheel cleaning system includes a cleaner with an abrasive material positioned on an outer surface of the cleaner. The cleaner is positionable adjacent to the weld wheel such that the abrasive material is aligned with the working surface of the weld wheel. An actuator can be used to selectively actuate the cleaner with a force sufficient to remove the layer of embedded material from the working surface of the weld wheel with the abrasive material. The debris from the cleaner can be removed by a vacuum.

8 Claims, 10 Drawing Sheets

WELD WHEEL CLEANING SYSTEM

PRIORITY

The present application is a divisional of U.S. patent application Ser. No. 15/801,415, entitled "WELD WHEEL CLEANING SYSTEM", which claims priority to U.S. Provisional Application Ser. No. 62/417,812, entitled "METHOD TO EXTEND THE INTEGRITY OF THE WORKING SURFACES OF WELD WHEELS FOR RESISTANCE SEAM WELDING MACHINES WITH A GOAL OF COST SAVINGS AND A REDUCTION IN SAFETY RISK ASSOCIATED WITH FREQUENT WELD WHEEL CHANGES," filed on Nov. 4, 2016, the disclosures of which are incorporated by reference herein.

BACKGROUND

In steel making, it may be desirable to coat steel with a protective coating by processing the steel through a continuous coating line. Such a continuous coating line typically includes a welder to join a tail end of one coil of steel with a head end of another coil of steel to maintain the continuous operation of the line. The welder may include a resistance seam welder that relies on weld wheels to conduct electricity and transmit force sufficient to cause material coalescence between the two pieces of steel as the weld wheels roll along the weld joint. Accordingly, heat generated from the resistivity of the steel to the electricity and the application of force generally results in coalescence at the weld joint to form a lap joint. Such combination of high heat and high pressure, however, may result in the deterioration of the weld wheels because of the chemical composition of the material and/or other debris becoming embedded into the working surfaces of the weld wheels. The thickness of the embedded material may not be uniform and may increase with each weld, thereby causing the quality of subsequent welds to degrade.

When the weld wheels degrade to the point where weld quality is affected, the weld wheels need to be changed with new weld wheels or weld wheels with re-machined surfaces. Otherwise, there may be a risk of breaking a weld in the furnace, causing the coating line to shut down for approximately 26 hours or more. For some materials, this embedded layer may build so quickly that the weld wheels need to be changed with new weld wheels or weld wheels with re-machined surfaces within about 5 or about 6 welds to continue to produce quality welds. Such frequent weld wheel changes may increase safety risks and may increase costs from purchasing new weld wheels.

The layer of embedded material has typically been removed from the working surfaces of the weld wheels by resurfacing the weld wheels. This process may involve removing the weld wheels from the welder to cut an outer layer off from each weld wheel using a cutting lathe. Further, resurfacing may remove between about ⅜ and about ½ inches from an outer diameter of the weld wheels and may increase the surface roughness average (Ra) of the working surfaces of the weld wheels to about 125 micro-inches, which may reduce the quality of subsequent welds performed by the weld wheels. Because the outer diameter of the weld wheel decreases during this process, resurfacing may only be repeated a limited number of times until the weld wheels need to be replaced.

In some versions, the welder is equipped with a weld wheel conditioner intended to maintain the shape of the working surfaces of the weld wheels through applied force. This reshaping process fails to clean the working surfaces of the weld wheels, and may even exacerbate the problem by embedding the welding residue further into the working surfaces of the weld wheels. This may inhibit the ability of the weld wheel to make quality welds, causing the replacement of the weld wheel.

There is therefore a need to provide an apparatus and method for cleaning weld wheels that is more efficient by cleaning the weld wheels without removing them the continuous coating line welding machine and that lowers costs by increasing the life of the weld wheels.

SUMMARY

A weld wheel cleaner and method is provided to address the aforementioned needs to achieve an improved continuous coating process.

In one embodiment, a weld wheel cleaning system may comprises a support having a first end a second end, a cleaner coupled with the first end of the support, and an actuator coupled with the second end of the support. An outer surface of the cleaner may have an abrasive material positionable adjacent to a working surface of a weld wheel. The actuator may be operable to selectively actuate the cleaner with a force sufficient to remove a layer of embedded material from the working surface of the weld wheel with the abrasive material. The abrasive material may comprise a wire brush or a deburring wheel. The actuator may comprise a motor operable to rotate the cleaner relative to the weld wheel. An arm may be coupled with the cleaner such that the arm is pivotable relative to the weld wheel to selectively position the cleaner adjacent to the weld wheel. A motor may be coupled with the arm to selectively pivot the arm. The arm may be adjustable to position the cleaner adjacent to a select one weld wheel of a plurality of weld wheels having varying outer diameters. The cleaner may be positionable between a pair of wheels such that the abrasive material is adjacent to the working surface of each weld wheel in the pair of wheels to simultaneously remove the layer of embedded material from both weld wheels. A vacuum may be operable to suction debris from the embedded material when the embedded material is removed from the working surface of the weld wheel by the abrasive material. The vacuum may comprise at least one vacuum tube with an inlet positioned proximal to a contact point between the abrasive material and the working surface of the weld wheel.

In another embodiment, an electric resistance welder may comprise a pair of weld wheels having a working surface along an outer circumference of each weld wheel, a support having a first end a second end, a cleaner coupled with the first end of the support having an abrasive material on an outer surface of the cleaner, an arm coupled with the cleaner pivotable to selectively position the abrasive material adjacent to the working surface of one or both weld wheels of the pair of weld wheels, and an actuator coupled with the second end of the support operable to selectively actuate the cleaner to remove a layer of embedded material from the working surface of the one or both weld wheels of the pair of weld wheels adjacent to the abrasive material.

A method of cleaning a working surface of a weld wheel using a weld wheel cleaning system with a cleaner having an abrasive material and an actuator coupled with the cleaner may comprise positioning the abrasive material of the cleaner adjacent to the working surface of the weld wheel, actuating the actuator to rotate the cleaner relative to the weld wheel, and removing a layer of embedded material from the working surface of the weld wheel with the abrasive material. The abrasive material may be positioned adjacent to the working surface of the weld wheel by pivoting an arm coupled with the cleaner. Debris from the embedded material removed from the weld wheel may be vacuumed with a vacuum. The cleaner may be rotated for a selected amount of time at a selected speed. The layer of embedded material may be removed after a select number of one or more welds performed by the weld wheel. The abrasive material of the cleaner may be positioned adjacent to the working surface of the weld wheel cleaner with a selected force against the working surface of the weld wheel. The layer of embedded material may be removed while the weld wheel is positioned on a welder in a steel coating line. The layer of embedded material may be removed while the weld wheel is being reshaped by a reconditioning roll.

DESCRIPTION OF FIGURES

It is believed that the present invention will be better understood from the following description of certain examples taken in conjunction with the accompanying drawings, in which like reference numerals identify like elements.

Figure 1:
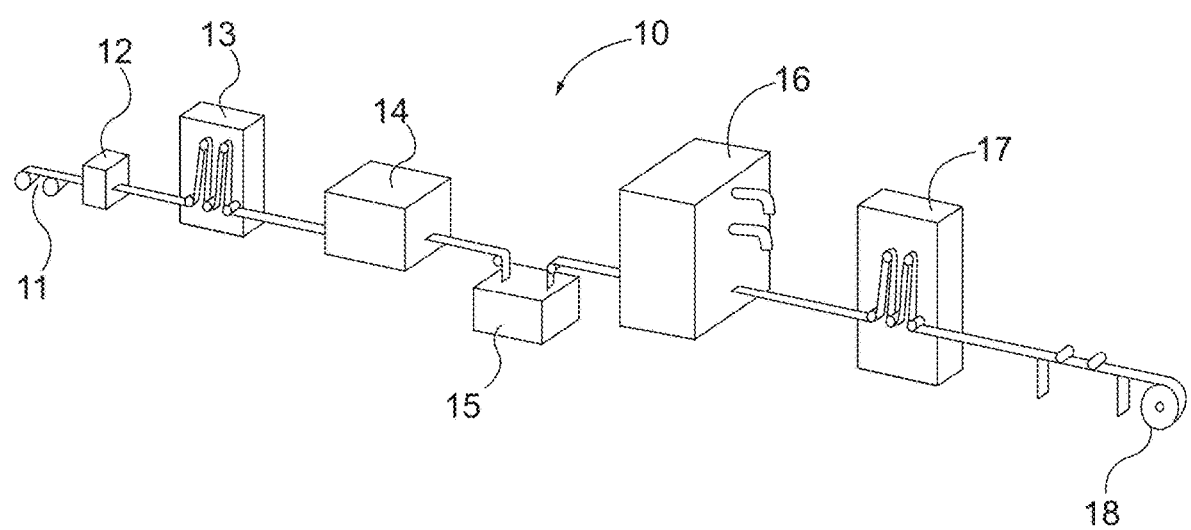
FIG. 1 depicts a perspective view of a continuous coating line.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects of the present disclosure, and together with the descriptions serve to explain the principles and concepts of the present disclosure; it being understood, however, that the present disclosure is not limited to the precise arrangements shown.

DETAILED DESCRIPTION

The following description and embodiments of the present disclosure should not be used to limit the scope of the present disclosure. Other examples, features, aspects, embodiments, and advantages of the present disclosure will become apparent to those skilled in the art from the following description. As will be realized, the present disclosure may contemplate alternate embodiments than those exemplary embodiments specifically discussed herein without departing from the scope of the present disclosure. Accordingly, the drawings and descriptions should be regarded as illustrative in nature and not restrictive.

Because it may be desirable to maintain clean weld wheel surfaces, a weld wheel cleaning system and method is provided. Such a weld wheel cleaning system may include abrasive wheel cleaners that rotate relative to each weld wheel with a force sufficient to clean the wheels. The debris from the cleaning operation may be removed by a vacuum system. While the weld wheel cleaning system and method is discussed in more detail below with respect to a continuous steel coating line, the weld wheel cleaning system and method can be used with any weld wheel for any resistive welding process.

Figure 2:
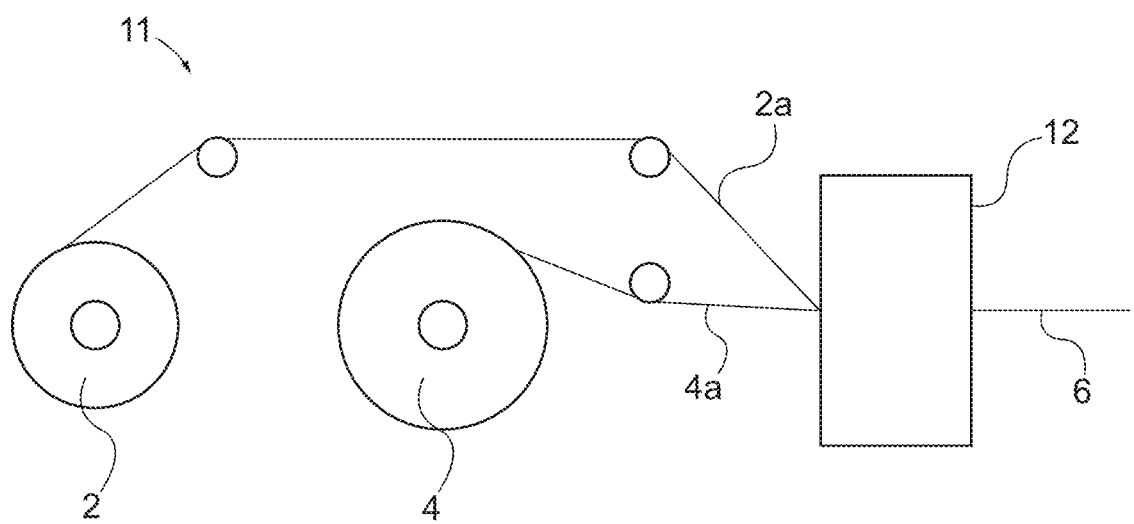
FIG. 2 depicts a partial side elevational view of the continuous coating line of FIG. 1, showing a welder.

FIG. 1 shows an example of a continuous steel coating line (10) comprising an uncoiler (11), a welder (12), an entry accumulator (13), a furnace (14), a pot (15), a cooling tower (16), an exit accumulator (17), and a coiler (18). In the illustrated embodiment, a cold rolled coil of steel is unrolled by the uncoiler (11) at the entry of the coating line (10). The steel then threads through a welder (12), as best seen in FIG. 2, where a tail end (2a) of one coil (2) is joined to a head end (4a) of another coil (4) to form a steel strip (6) to maintain the continuous operation of the coating line (10). Referring back to FIG. 1, following the welder (12), the steel strip (6) can travel through an entry accumulator (13) where multiple loops of steel can be lengthened and/or shortened so that the process continues uninterrupted while the coils are joined together. The steel strip (6) may then be heated in a furnace (14) and travel into a pot (15) where it receives a coating of protective material, such as aluminum, zinc, etc. The steel strip (6) may then proceed through a cooling tower (16) to cool the coating. After cooling, the steel strip (6) is then sent through an exit accumulator (17) and then recoiled by the coiler (18) in the illustrated embodiment. Other suitable configurations for processing the steel will be apparent to one with ordinary skill in the art in view of the teachings herein.

Figure 3:
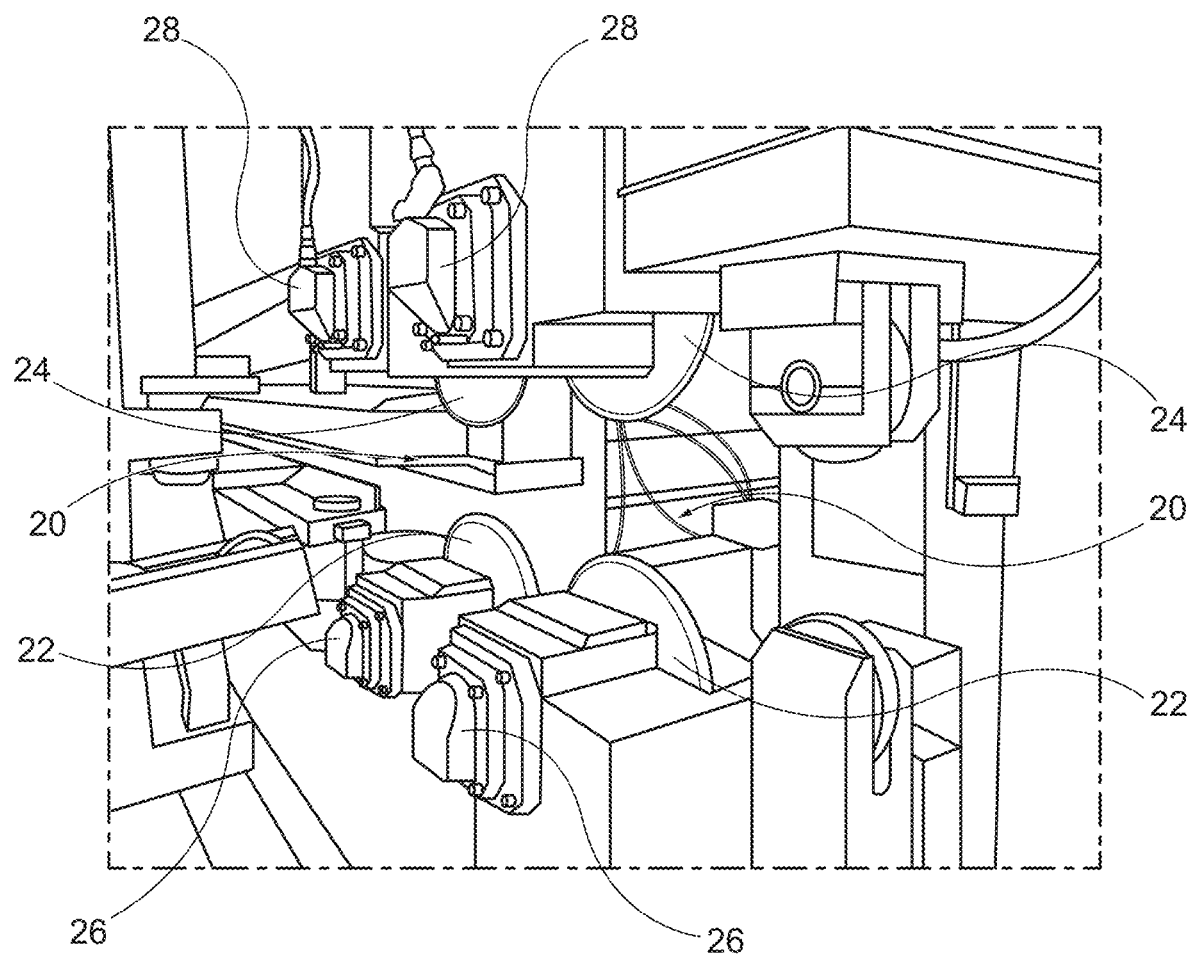
FIG. 3 depicts a partial perspective view of the welder of FIG. 2.
Figure 4:
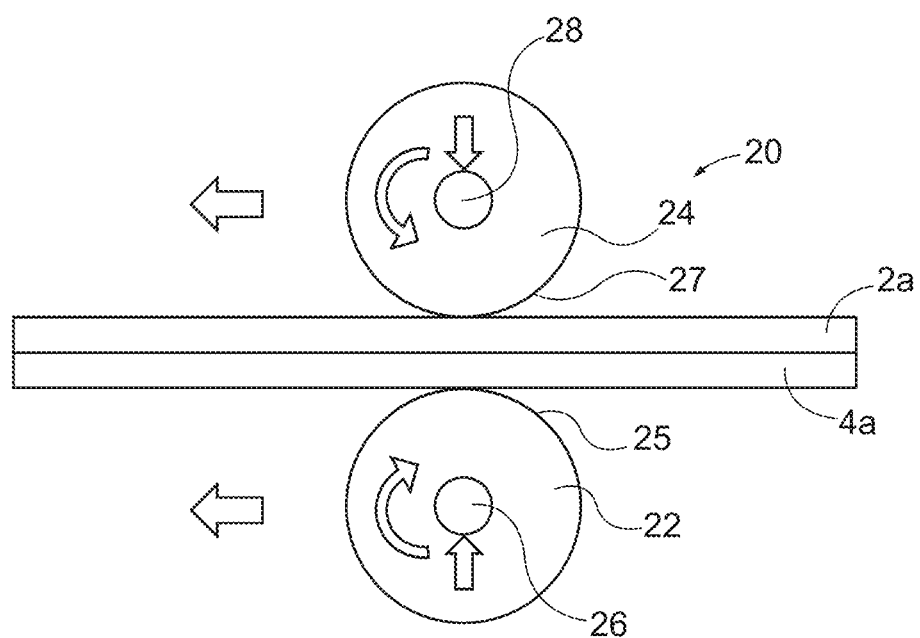
FIG. 4 depicts a rear view of a pair of weld wheels of the welder of FIG. 3 performing a weld between two pieces of steel.
Figure 5:
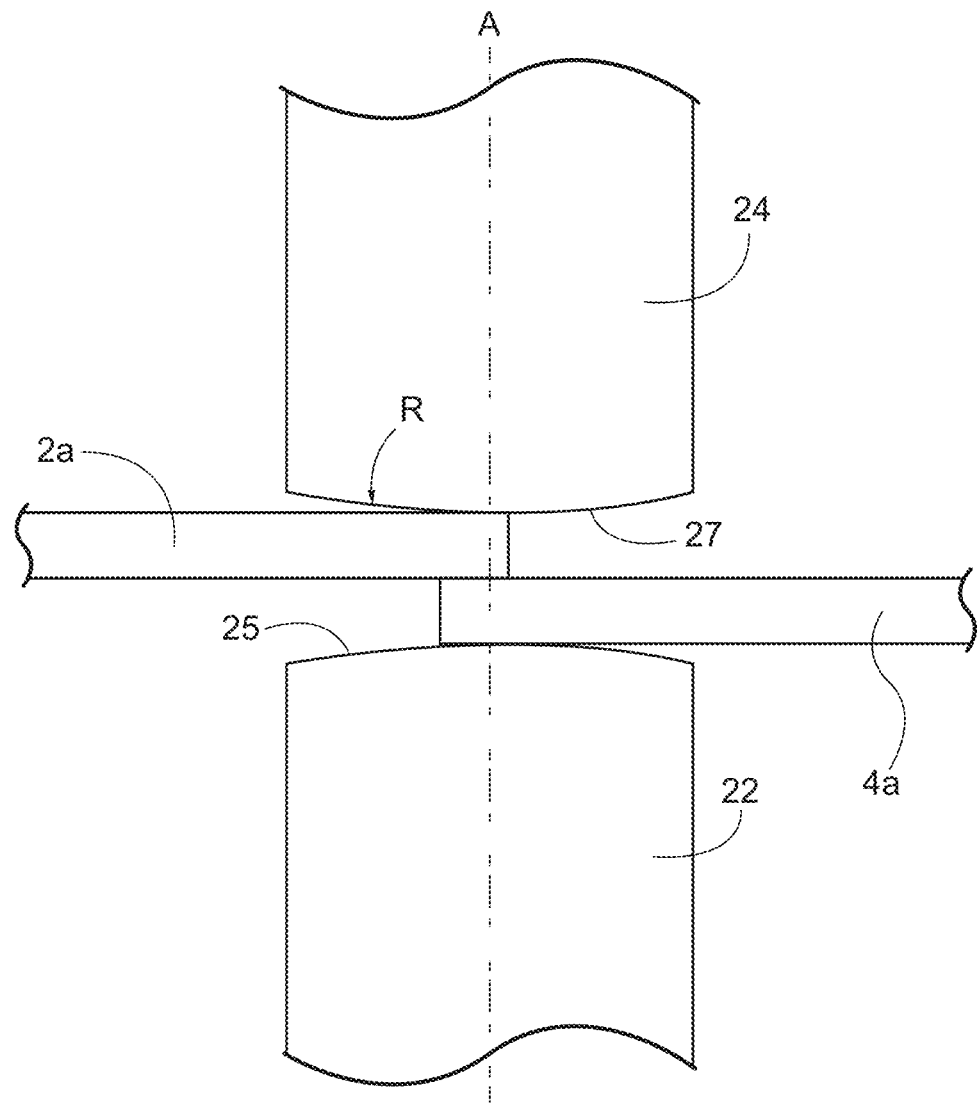
FIG. 5 depicts a partial end view of the pair of weld wheels of FIG. 4.

Referring to FIG. 3, the welder (12) in the illustrated embodiment is an electric resistance welder comprising two pairs of weld wheels (20). While a first leading pair of weld wheels (20) is shown positioned in front of a trailing pair of weld wheels (20), any suitable number of weld wheel pairs (20) can be used. Each pair of weld wheels (20) comprises an upper weld wheel (24) and a lower weld wheel (22) aligned below the upper weld wheel (24) along a longitudinal axis A, as shown in FIGS. 4 and 5. The weld wheels (22, 24) may have a radius between about 5 and about 6 inches and a thickness of about 0.625 inches, but other suitable dimensions can be used. The weld wheels (22, 24) can further have a curved working surface (25, 27) along the circumference of each weld wheel (22, 24), where the weld wheel (22, 24) contacts the material to be welded, with a radius of about 2 inches, but other suitable dimensions can be used. The weld wheels (22, 24) can be made from copper or any other suitable conductive material.

As best seen in FIG. 4, the lower weld wheel (22) is positioned on a lower arbor (26) such that the arbor (26) is configured to apply an upward force to the lower weld wheel (22), rotate the lower weld wheel (22), and apply a current to the lower weld wheel (22). The upper weld wheel (24) is positioned on an upper arbor (28) such that the arbor (28) is configured to apply a downward force to the upper weld wheel (24), rotate the upper weld wheel (24), and apply a current to the upper weld wheel (24). The current may be between about 16,000 and about 17,000 amps with a weld wheel force approaching about 2,000 kg, but other suitable amounts can be used. The overlapping ends of the steel strips (2a, 4a) can thereby be positioned between the working surfaces (25, 27) of the pair of weld wheels (20), as best seen in FIG. 5, such that the steel strips (2a, 4a) are compressed between the pair of weld wheels (20). In the illustrated embodiment, the lower arbor (26) rotates the lower weld wheel (22) clockwise and the upper arbor (28) rotates the upper weld wheel (24) counterclockwise to thereby translate the pair of weld wheels (20) along the steel strips (2a, 4a) to form a weld, as shown in FIG. 4. In other versions, the pair of weld wheels (20) may rotate in any suitable direction to translate the pair of weld wheels (20). Accordingly, heat generated from the resistivity of the steel strips (2a, 4a) to the electricity and the application of force applied by the pair of weld wheels (20) along their working surfaces (25, 27) generally results in coalescence at the weld joint to weld the steel strips (2a, 4a) together. Temperatures at the contact interface between the weld wheels (22, 24) and the steel strips (2a, 4a) may exceed about 2,000° F., but other suitable temperatures can be used. Still other suitable configurations for welder (12) will be apparent to one with ordinary skill in the art in view of the teachings herein.

Figure 6:
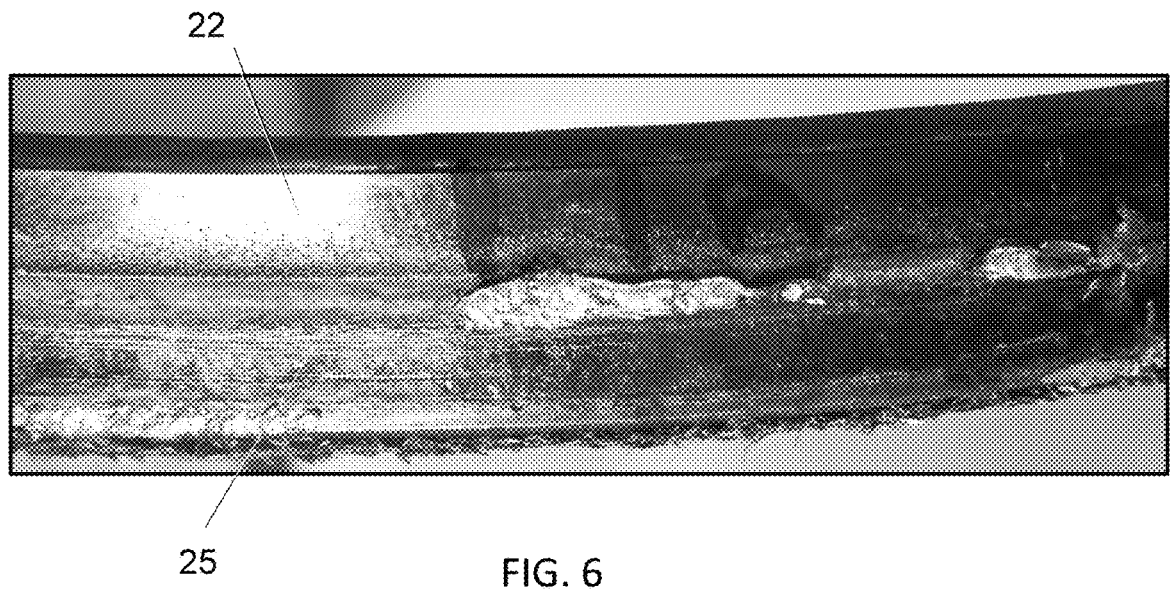
FIG. 6 depicts a partial perspective view of a working surface of a weld wheel having an embedded layer of debris.
Figure 7:
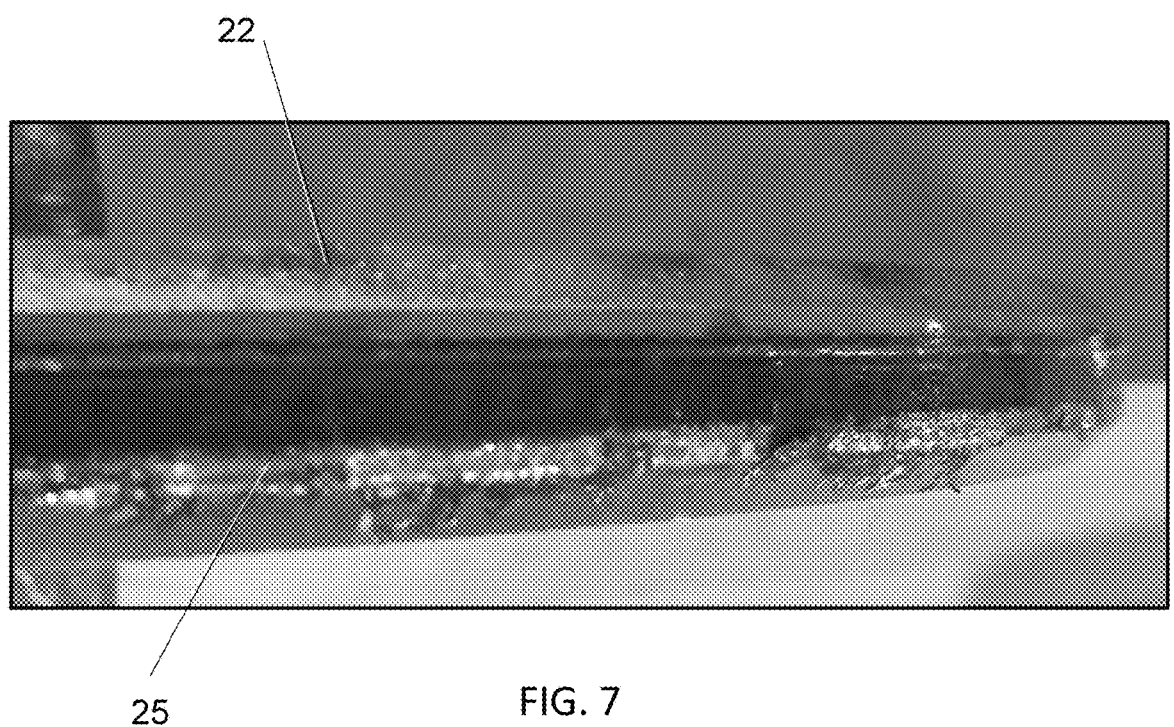
FIG. 7 depicts a partial perspective view of a working surface of another weld wheel having an embedded layer of debris.
Figure 8:
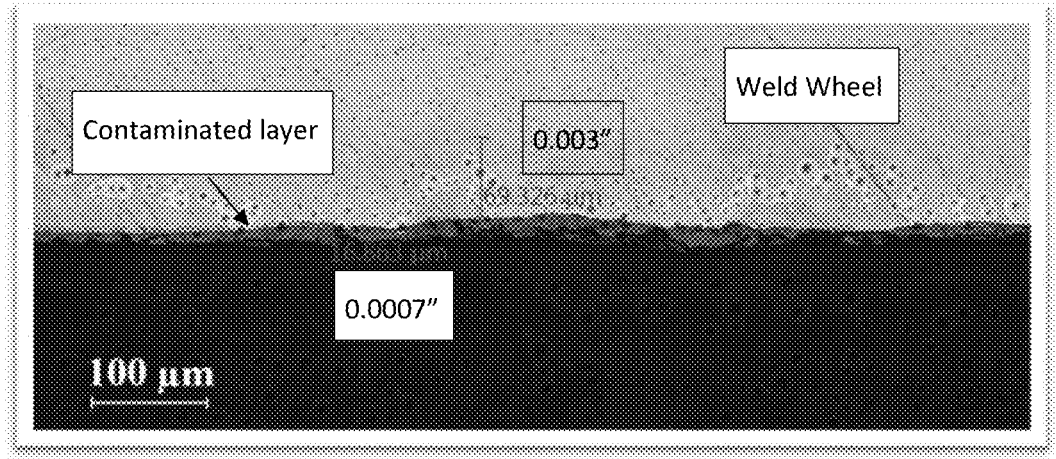
FIG. 8 depicts a cross-sectional view of a working surface of another weld wheel having an embedded layer of debris.
Figure 9:
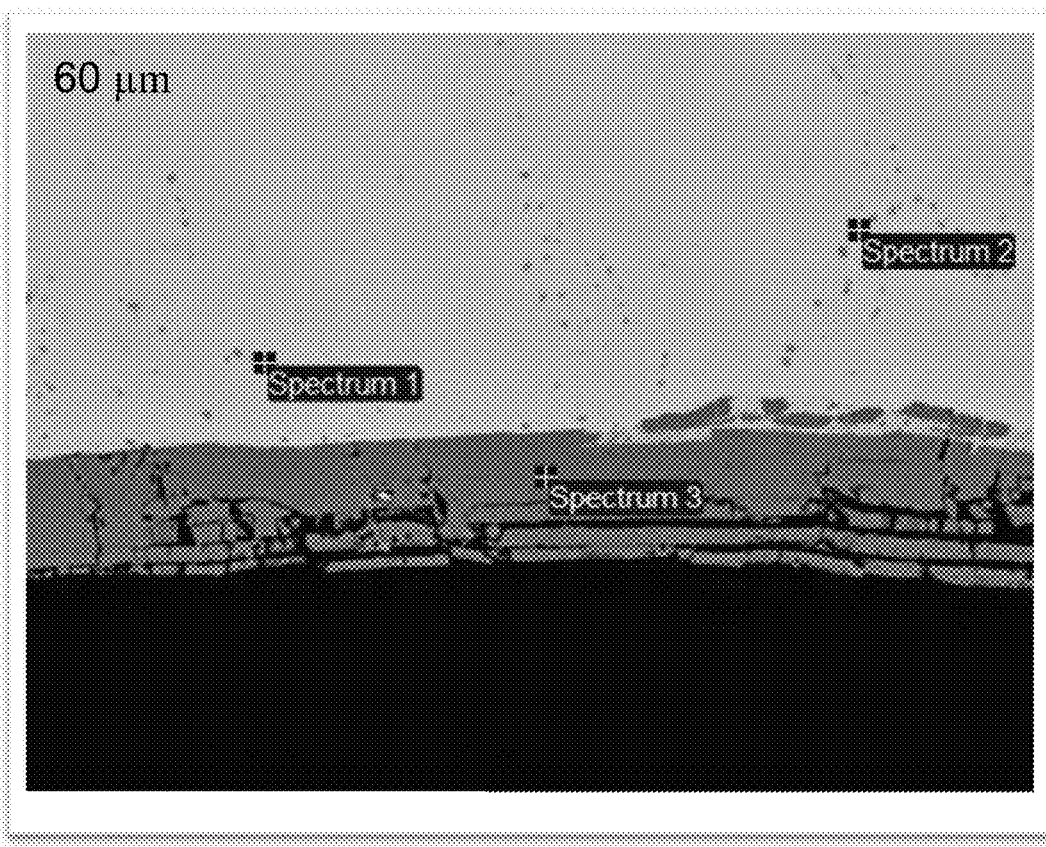
FIG. 9 depicts a cross-sectional view of a working surface of another weld wheel having an embedded layer of debris.

The combination of high heat and high pressure may result in the deterioration of the weld wheels (22, 24) because a layer of Fe-oxide coating, and other debris, associated with the welding process may become embedded into the working surfaces (25, 27) of the weld wheels (22, 24). The thickness of the oxide layer may not be uniform and may increase with each weld. For instance, an example of a weld wheel having a layer of embedded material is shown in FIGS. 6-7. A cross-section of a layer of embedded material is shown in FIGS. 8-9. For instance, the embedded layer in the illustrated embodiment has a thickness of about 0.0007 inches on the surface of the weld wheel and is further embedded about 0.003 inches into the weld wheel. This embedded layer comprises Fe-oxide at the surface of the weld wheel, as shown at Spectrum 3 in FIG. 9, as well as some nodules of chromium and silicon, as shown at Spectrum 1 and 2 in FIG. 9. This non-uniform layer of embedded material may thereby inhibit the contact of the working surfaces (25, 27) of the weld wheels (22, 24) with the steel (2a, 4a) such that it may degrade the quality of subsequent welds.

Figure 10:
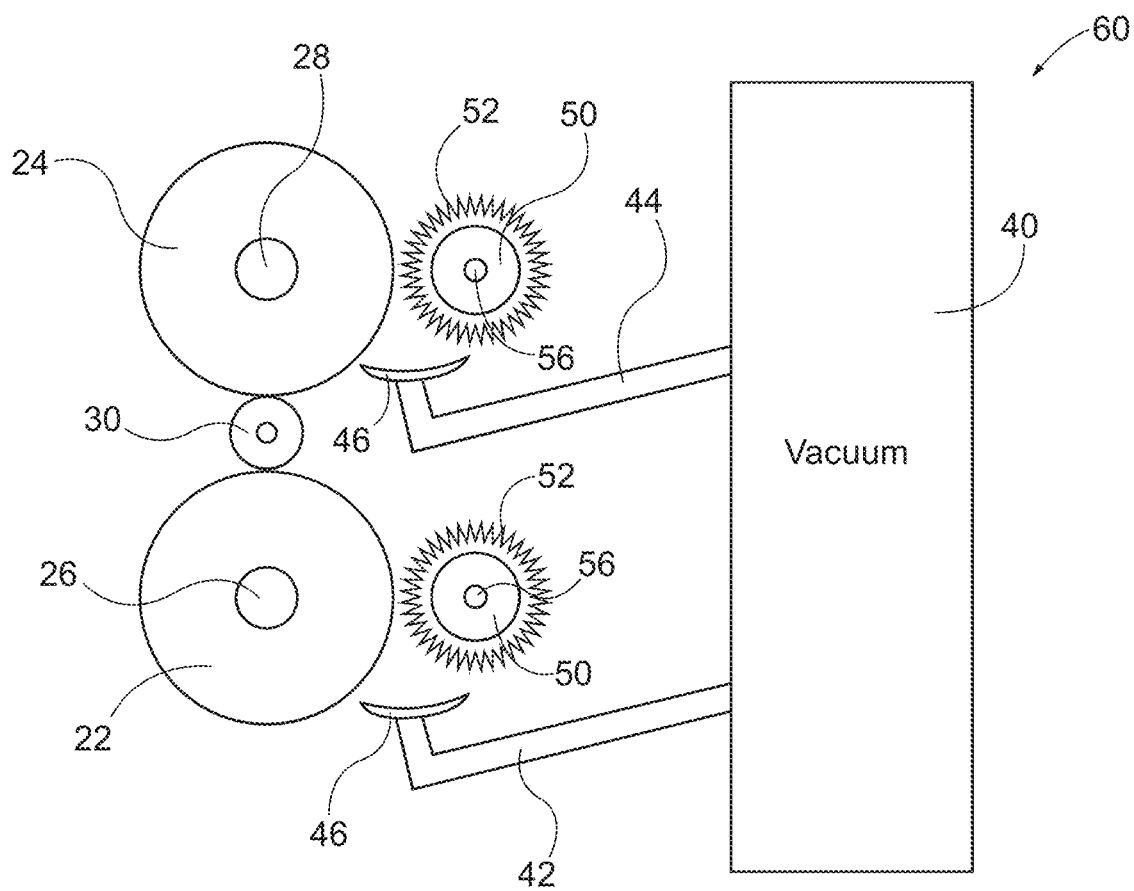
FIG. 10 depicts a front view of a weld wheel cleaning system for use with the weld wheels of FIG. 3.
Figure 11:
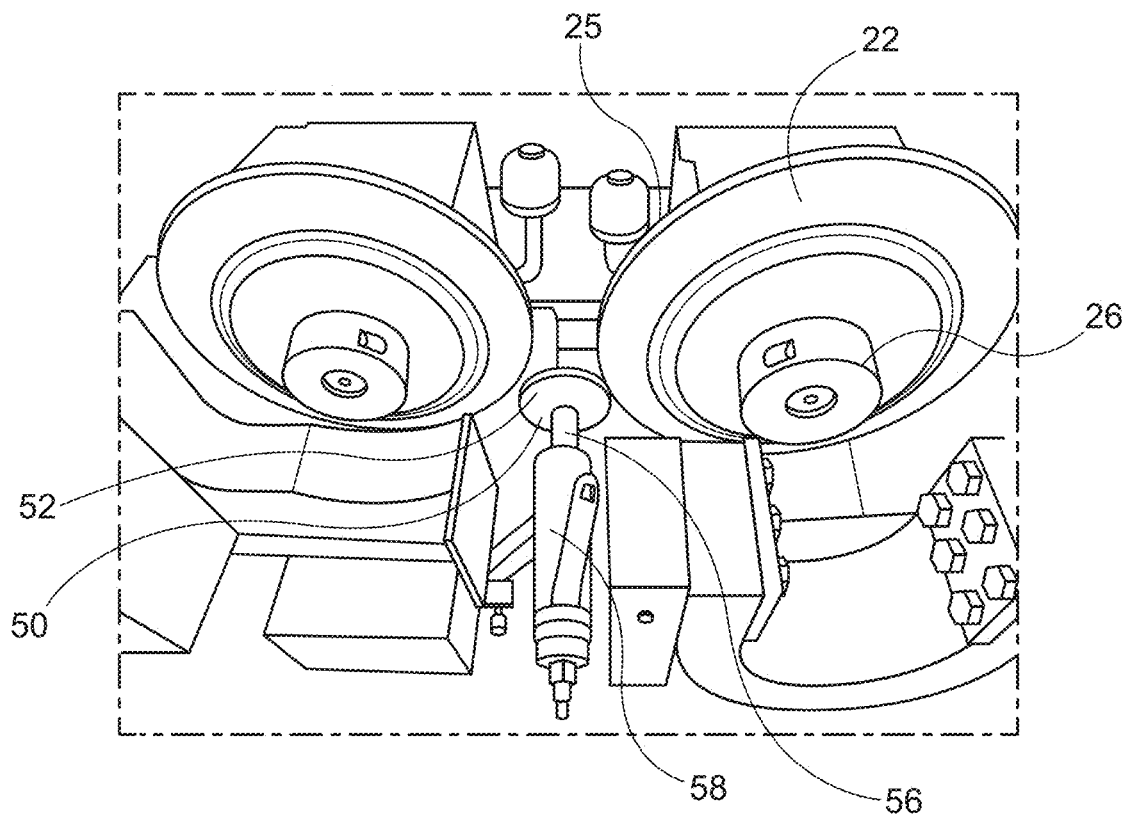
FIG. 11 depicts a perspective view of the weld wheel cleaning system of FIG. 10.
Figure 12:
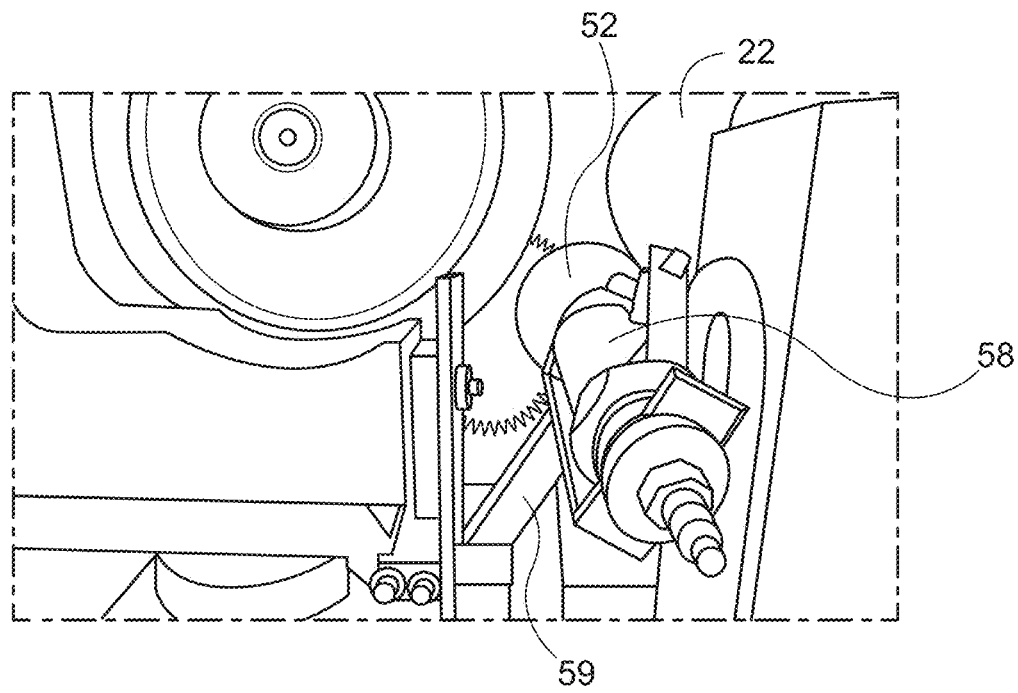
FIG. 12 depicts a partial front view of the weld wheel cleaning system of FIG. 10.

Therefore, it may be desirable to clean the working surfaces (25, 27) of the weld wheels (22, 24) with a weld wheel cleaning system (60) to remove the layer of embedded material without the need to resurface and/or change the weld wheels (22, 24). Referring to FIGS. 10-12, such a weld wheel cleaning system (60) is provided comprising at least one cleaner (50) and a vacuum (40). Each cleaner (50) comprises an abrasive material (52) positioned on an outer surface of the cleaner (50). The abrasive material (52) can include a wire brush or a deburring wheel with a grade sufficient to remove embedded material from the working surfaces (25, 27) of the weld wheels (22, 24). For instance, a Scotch-Brite EXL Deburring Wheel having a fine or medium finish made by 3M can be used. Other suitable abrasive materials (52) will be apparent to one with ordinary skill in the art in view of the teachings herein.

Each cleaner (50) is then positioned on a support (56) such that the abrasive material (52) is adjacent to the working surfaces (25, 27) of the weld wheels (22, 24). While two cleaners (50) are shown in FIG. 10 positioned adjacent to each weld wheel (22, 24) in a pair of weld wheels (20), any suitable number of cleaners (50) can be used. In the illustrated embodiment of FIG. 11, one cleaner (50) is shown to clean a lower trailing weld wheel of a welder (12). In some other versions, one cleaner (50) can be positioned between the weld wheels (22, 24) to clean both weld wheels (22, 24). Any other suitable number of cleaners (50) can be used. The support (56) in the illustrated embodiment is mounted on an arm (59) that can be pivoted to selectively position the cleaner (50) adjacent to the weld wheel (22, 24). The cleaner (50) can be operated by an actuator (58), such as an air motor, an electrical motor, or any other suitable mechanical actuator. Accordingly, the cleaner (50) can rotate on the support (56) relative to the weld wheel (22, 24) to clean the working surfaces (25, 27) of the weld wheel (22, 24). The cleaner (50) is thereby adjustable to clean weld wheels (22, 24) of varying diameters. In some versions, both the cleaner (50) and the weld wheel (22, 24) are rotated during the cleaning process. In some other versions, the weld wheel (22, 24) is stationary while the cleaner (50) is rotated or the cleaner (50) is stationary while the weld wheel (22, 24) is rotated. Additionally or alternatively, the cleaner (50) can translate or oscillate relative to the weld wheel (22, 24). Still other suitable configurations for the cleaner (50) will be apparent to one with ordinary skill in the art.

As shown in FIG. 10, a vacuum (40) is used to remove debris generated by the cleaning process of the weld wheel cleaning system (60). In the illustrated embodiment, a vacuum tube (44) extends from the vacuum (40) such that an inlet of the vacuum tube (44) is adjacent to the area where the cleaner (50) abuts the working surface (25, 27) of the weld wheel (22, 24). While the illustrated embodiment shows two vacuum tubes (44) at each cleaner (50), any other suitable number of vacuum tubes (44) can be used. In some versions, this cleaning area is contained by a flexible, conforming enclosure (46). Accordingly, debris removed from the weld wheels (22, 24) is suctioned through the vacuum tube (44) by the vacuum (40). Other suitable configurations for the vacuum (40) will be apparent to one with ordinary skill in the art in view of the teachings herein.

The weld wheel cleaning system (60) can thereby be used to clean and/or remove the Fe-oxide layer and any other debris from welding from the working surfaces (25, 27) of the weld wheels (22, 24). This weld wheel cleaning system (60) can be used in line without the need to remove the weld wheels (22, 24) from the welder (12), saving on downtime of the coating line (10). In some versions, the weld wheel cleaning system (60) is insulated from the ground to allow the option of cleaning while welding without shunting the weld current. In some other versions, the weld wheel cleaning system (60) is operated during the existing weld wheel resurfacing operation. As shown in FIG. 10, the conditioning operation comprises weld wheels (22, 24) rotating with the application of force against a non-driven reconditioning roll (30). The cleaning system (60) can be installed on a welder (12) with minimal installation modifications and positioned such that it does not impede weld wheel (22, 24) changes and/or the reconditioning roll (30), and/or such that the cleaning system (60) can be easily serviced.

To perform a cleaning, the cleaning system (60) can be operated to position the abrasive material (52) of a cleaner (50) adjacent to the working surface (25, 27) of a weld wheel (22, 24) by adjusting the arm (59) as shown in FIGS. 11 and 12. For instance, the arm (59) may be translated and/or pivoted manually and/or automatically by an arm motor.

Figure 13:
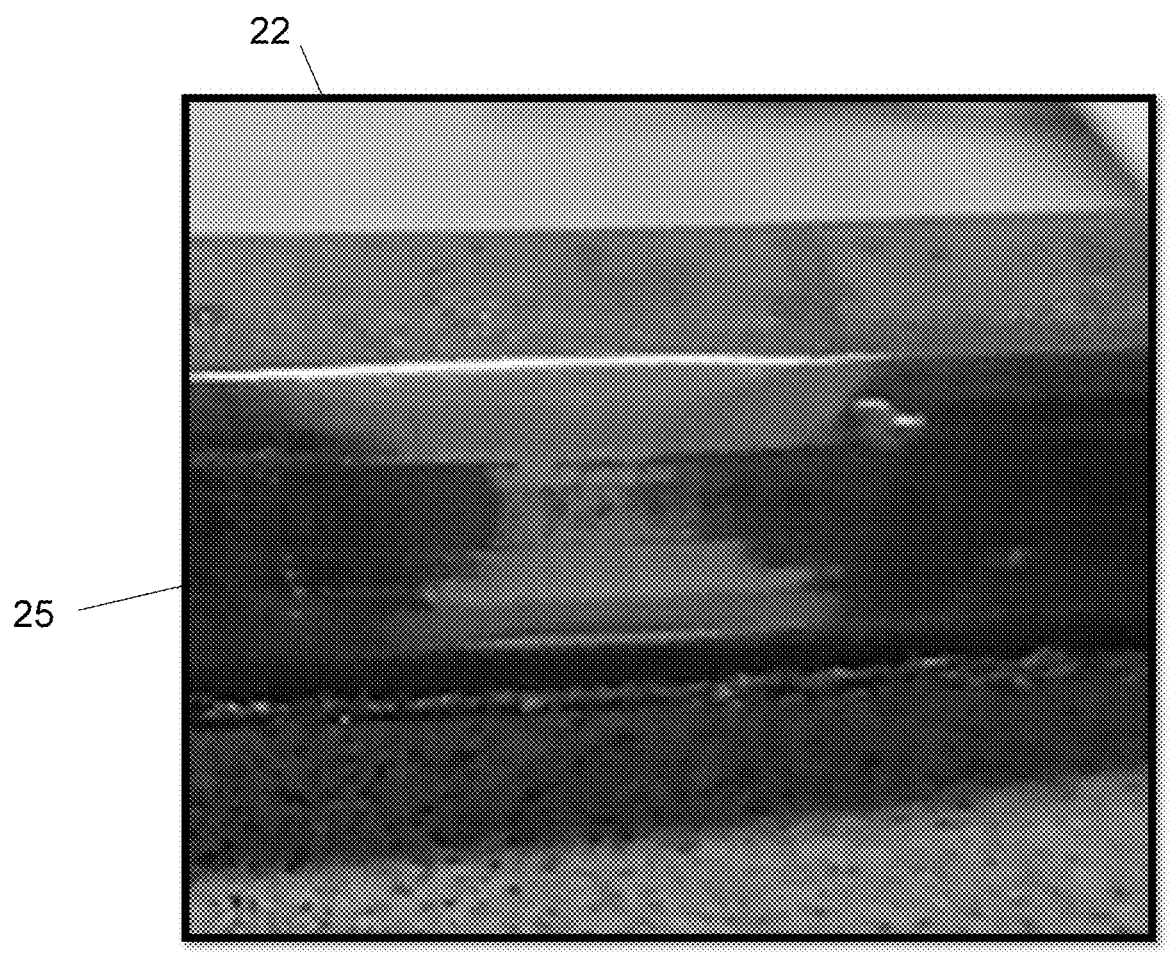
FIG. 13 depicts a partial perspective view of a working surface of another weld wheel cleaned by a weld wheel cleaning system.

Such an arm motor can be an air cylinder or any other suitable motor to provide sufficient force of the cleaner (50) against the weld wheel (22, 24). Once the cleaner (50) of the cleaning system (60) is in the desired position, the actuator (58) of the cleaning system (60) can be started to rotate the cleaner (50) relative to the weld wheel (22, 24). Accordingly, the abrasive material (52) of the cleaner (50) sufficiently cleans and/or removes the Fe-oxide layer and any other debris from welding from the working surfaces (25, 27) of the weld wheels (22, 24). An example of a clean weld wheel (22, 24) is shown in FIG. 13. During this cleaning process, the vacuum (40) can be activated to suction removed debris through the vacuum tube (44). The cleaning system (60) may thereby be activated for a selected time to sufficiently clean the weld wheels (22, 24), such as less than about 1 minute, or any other suitable amount of time. Once cleaning is completed, the actuator (58) can be turned off to stop rotation of the cleaner (50) and the arm (59) can be pivoted to move the cleaner (50) away from the weld wheel (22, 24). Other suitable configurations for operating the cleaning system (60) will be apparent to one with ordinary skill in the art in view of the teachings herein.

For instance, this cleaning process can then be repeated on the same weld wheel (22, 24) and/or a different weld wheel (22, 24) of the welder (12). In some versions, the cleaning process is performed after each weld. In some other versions, the cleaning process is performed after more than one weld, such as five welds, ten welds, or any other suitable number of welds. In some versions, the abrasive force of the cleaner (50) against each weld wheel (22, 24) and/or the rotational speed of the cleaner (50) is adjustable. The cleaning system (60) may thereby remove about $\frac{1}{1000}$ of an inch of material from the working surface (25, 27) of a weld wheel (22, 24), which is less than the resurfacing process that typically removes between about $\frac{3}{8}$ inch and about $\frac{1}{2}$ inch from the working surface (25, 27) of a weld wheel (22, 24). The cleaning system (60) may further provide an Ra of about 32 micro-inches at the working surface (25, 27) of the weld wheel (22, 24), which is smoother than the resurfacing process that typically provides an Ra of about 125 micro-inches. Accordingly, the cleaning system (60) may prolong the cleanliness and/or integrity of the working surfaces (25, 27) of the weld wheels (22, 24). This may allow a weld wheel (22, 24) to perform more welds, reducing the need for resurfacing and/or frequent weld wheel (22, 24) changes to save time and/or reduce costs.

EXAMPLE

Weld testing confirmed that both the existing weld code for welding light gauge Bake Hardenable (BH) materials and an alternative weld code being considered resulted in rapid degradation of the upper and lower trailing weld wheels, after 5 test welds. The surfaces of the weld wheels were degraded to the point that acceptable production welds could no longer be achieved.

Subsequently, six test welds were produced on 0.64 mm BH grade steel with a tensile strength of about 250 MPa. Typically, after 5 welds the surfaces of the trailing weld wheels are degraded to the point of not being able to produce acceptable welds. Therefore, for these six test welds, a hand held, electric powered, rotating wire brush was used to clean the upper and lower trailing wheels after each weld. Inter-weld cleaning was terminated after the $6^{th}$ weld. Subsequent to the termination of cleaning, another five welds were produced and the aforementioned condition of the weld wheel surfaces were not capable of producing acceptable production welds. This test proved that inter-weld cleaning of the trailing weld wheel surfaces is capable of extending the number of acceptable welds that can be produced, thereby eliminating the potential for line speed reductions, risk of producing unacceptable welds, and prolonging the intervals between trailing weld wheel changes.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

What is claimed is:

1. A weld wheel cleaning system comprising:
    a support having a first end and a second end;
    a cleaner coupled with the first end of the support, wherein an outer surface of the cleaner comprises an abrasive material, wherein the cleaner is positionable adjacent to a weld wheel such that the abrasive material is aligned with a working surface of the weld wheel;
    an actuator coupled with the second end of the support, wherein the actuator is operable to selectively actuate the cleaner with a force sufficient to remove a layer of embedded material from the working surface of the weld wheel with the abrasive material; and
    an arm coupled with the cleaner, wherein the arm is pivotable relative to the weld wheel to selectively position the cleaner adjacent to the weld wheel, and wherein the arm is adjustable to position the cleaner adjacent to a select one weld wheel of a plurality of weld wheels having varying outer diameters.

2. The weld wheel cleaning system of claim 1, wherein the abrasive material comprises a wire brush.

3. The weld wheel cleaning system of claim 1, wherein the cleaner comprises a deburring wheel.

4. The weld wheel cleaning system of claim 1, wherein the actuator comprises a motor operable to rotate the cleaner relative to the weld wheel.

5. The weld wheel cleaning system of claim 1 further comprising a motor coupled with the arm, wherein the motor is operable to selectively pivot the arm.

6. The weld wheel of cleaning system of claim 1 further comprising a vacuum operable to suction debris from the embedded material when the embedded material is removed from the working surface of the weld wheel by the abrasive material.

7. The weld wheel cleaning system of claim 6, wherein the vacuum comprises at least one vacuum tube with an inlet positioned proximal to a contact point between the abrasive material and the working surface of the weld wheel.

8. An electric resistance welder comprising:
    a pair of weld wheels, wherein each weld wheel of the pair of weld wheels comprises a working surface along an outer circumference of the weld wheel;
    a support having first end and a second end;
    a cleaner coupled with the first end of the support, wherein an outer surface of the cleaner comprises an abrasive material, and wherein the cleaner is positionable between the pair of weld wheels such that the abrasive material is adjacent to the working surface of each weld wheel in the pair of weld wheels to simultaneously remove the layer of embedded material from both weld wheels;

an arm coupled with the cleaner, wherein the arm is pivotable to position the abrasive material adjacent to the working surface of one or both weld wheels of the pair of weld wheels; and an actuator coupled with the second end of the support, wherein the actuator is operable to actuate the cleaner to remove a layer of embedded material from the working surface of the one or both weld wheels of the pair of weld wheels adjacent to the abrasive material.

\* \* \* \* \*